(12) United States Patent
Luo et al.

(10) Patent No.: US 11,050,493 B1
(45) Date of Patent: Jun. 29, 2021

(54) CALIBRATING A TESTING DEVICE THAT TESTS BASE STATIONS WITH MASSIVE MIMO ANTENNA SYSTEMS

(71) Applicant: VIAVI Solutions Inc., San Jose, CA (US)

(72) Inventors: Hua Luo, Luton (GB); Kexuan Sun, Stevenage (GB); Li-Ke Huang, St Albans (GB); Wei Li, Stevenage (GB)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 16/732,072

(22) Filed: Dec. 31, 2019

(51) Int. Cl.
*H04B 17/12* (2015.01)
*H04B 7/0452* (2017.01)
*H04L 5/14* (2006.01)
*H04W 16/28* (2009.01)

(52) U.S. Cl.
CPC .......... *H04B 17/12* (2015.01); *H04B 7/0452* (2013.01); *H04L 5/1438* (2013.01); *H04W 16/28* (2013.01)

(58) Field of Classification Search
CPC .. H04B 7/0413; H04B 17/12; H04B 17/3912; H04B 7/0452; H04B 17/309; H04B 3/46; H04B 17/29
See application file for complete search history.

(56) References Cited

U.S. PATENT DOCUMENTS

2016/0212641 A1* 7/2016 Kong ................. H04B 17/0087
2019/0165837 A1* 5/2019 Son ...................... H04B 17/102

* cited by examiner

*Primary Examiner* — Keith Ferguson
(74) *Attorney, Agent, or Firm* — Harrity & Harrity, LLP

(57) ABSTRACT

A testing device may receive, via a receiving port of a radio frequency (RF) frontend of the testing device, a downlink pilot signal, and may determine a phase associated with the downlink pilot signal. The testing device may transmit, via a transmitting port of the RF frontend of the testing device, an uplink pilot signal. The testing device may receive, after transmitting the uplink pilot signal, the uplink pilot signal via the receiving port of the RF frontend of the testing device. The testing device may determine, after receiving the uplink pilot signal, a phase associated with the uplink pilot signal. The testing device may adjust, based on a phase difference between the phase of the downlink pilot signal and the phase of the uplink pilot signal, one or more transmission settings of the testing device.

20 Claims, 10 Drawing Sheets

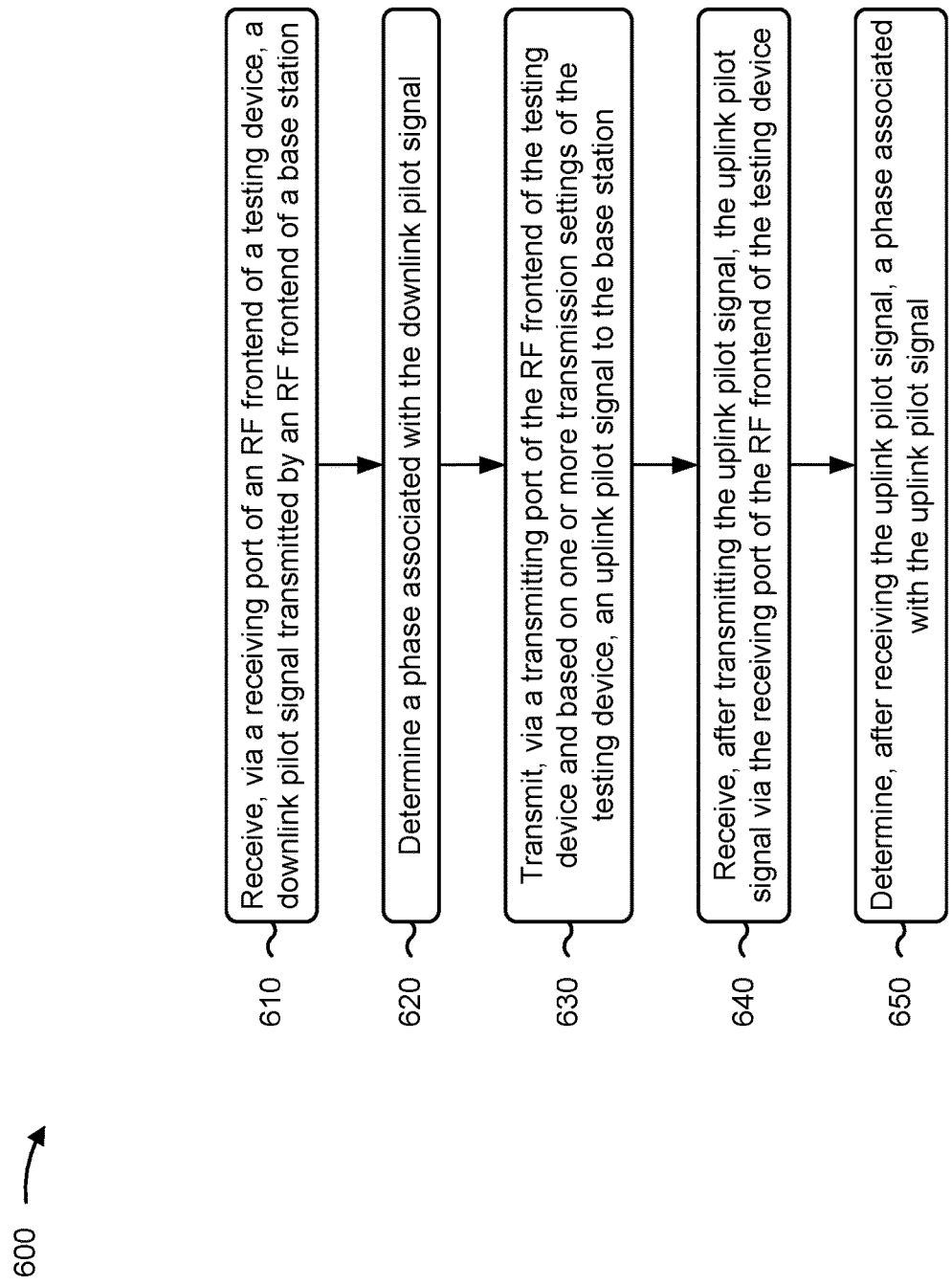

CALIBRATING A TESTING DEVICE THAT TESTS BASE STATIONS WITH MASSIVE MIMO ANTENNA SYSTEMS

BACKGROUND

A base station may utilize a massive multiple-input multiple-output (MIMO) antenna system to support multiple data streams at the same time. A massive MIMO antenna system may enable a base station to employ different beamforming strategies.

SUMMARY

According to some implementations, a testing device may include one or more radio frequency (RF) frontends, wherein each RF frontend, of the one or more RF frontends, includes a respective transmitting port and a respective receiving port; one or more power splitters, wherein each power splitter, of the one or more power splitters, is connected to a respective RF frontend of the one or more RF frontends; and one or more processors configured to: receive, via a receiving port of a particular RF frontend, of the one or more RF frontends, a downlink pilot signal on a downlink channel; determine a phase associated with the downlink pilot signal; transmit, via a transmitting port of the particular RF frontend and based on one or more transmission settings, an uplink pilot signal on an uplink channel; receive, after transmitting the uplink pilot signal on the uplink channel, the uplink pilot signal via the receiving port of the particular RF frontend and a particular power splitter, of the one or more power splitters, associated with the particular RF frontend; determine, after receiving the uplink pilot signal, a phase associated with the uplink pilot signal; determine a phase difference between the phase associated with the downlink pilot signal and the phase associated with the uplink pilot signal; determine that the phase difference between the phase associated with the downlink pilot signal and the phase associated with the uplink pilot signal satisfies a threshold; and adjust, based on the phase difference between the phase associated with the downlink pilot signal and the phase associated with the uplink pilot signal satisfying the threshold, the one or more transmission settings.

According to some implementations, a method may include receiving, by a testing device and via a receiving port of an RF frontend of the testing device, a downlink pilot signal; determining, by the testing device, a downlink channel associated with the downlink pilot signal and a phase associated with the downlink pilot signal; transmitting, by the testing device and via a transmitting port of the RF frontend of the testing device, an uplink pilot signal on an uplink channel that is reciprocal to the downlink channel; receiving, by the testing device and after transmitting the uplink pilot signal on the uplink channel, the uplink pilot signal via the receiving port of the RF frontend of the testing device; determining, by the testing device and after receiving the uplink pilot signal, a phase associated with the uplink pilot signal; determining, by the testing device, a phase difference between the phase associated with the downlink pilot signal and the phase associated with the uplink pilot signal; determining, by the testing device, that the phase difference satisfies a threshold; adjusting, by the testing device and based on the phase difference satisfying the threshold, one or more transmission settings of the testing device; and transmitting, by the testing device and based on the adjusted one or more transmission settings, one or more additional uplink pilot signals on the uplink channel via the transmitting port of the RF frontend of the testing device.

According to some implementations, a non-transitory computer-readable medium may store one or more instructions. The one or more instructions, when executed by one or more processors of a testing device, may cause the one or more processors to: receive, via a receiving port of an RF frontend of the testing device, a downlink pilot signal transmitted by an RF frontend of a base station; determine a phase associated with the downlink pilot signal; transmit, via a transmitting port of the RF frontend of the testing device and based on one or more transmission settings of the testing device, an uplink pilot signal to the base station; receive, after transmitting the uplink pilot signal, the uplink pilot signal via the receiving port of the RF frontend of the testing device; determine, by the testing device and after receiving the uplink pilot signal, a phase associated with the uplink pilot signal; and selectively adjust, based on the phase associated with the downlink pilot signal and the phase associated with the uplink pilot signal, the one or more transmission settings of the testing device.

BRIEF DESCRIPTION OF THE DRAWINGS

As shown in FIGS. 1A-IE, the example implementation(s) 100 may include a base station, a testing device, and/or the like.

FIGS. 4-6 are flowcharts of example processes for calibrating a testing device that tests base stations with massive MIMO antenna systems.

DETAILED DESCRIPTION

Figure 1A:
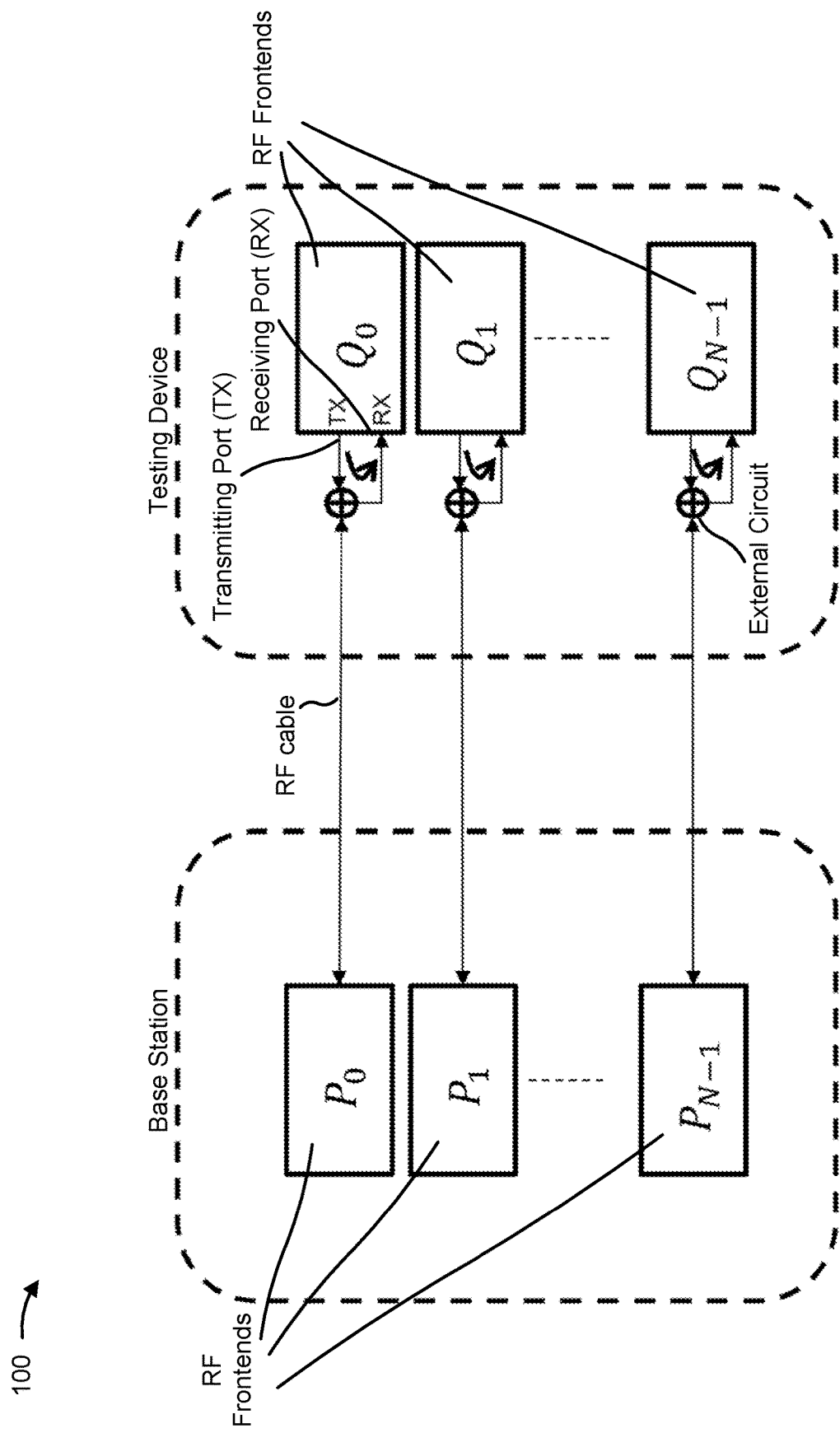
FIGS. 1A-IE are diagrams of one or more example implementations described herein.

The following detailed description of example implementations refers to the accompanying drawings. The same reference numbers in different drawings may identify the same or similar elements.

After a base station is manufactured and/or assembled, a testing device may test one or more components of the base station (e.g., in a laboratory setting before the base station is deployed for real-world use). For example, when a base station includes a massive multiple-input multiple-output (MIMO) antenna system, a testing device may be used to test one or more functionalities of each radio frequency (RF) frontend of the massive MIMO antenna system. In many cases, the testing device may include a plurality of radio frequency (RF) frontends (e.g., that respectively include a subMiniature version A (SMA) connector and/or the like), wherein each RF frontend of the plurality of RF frontends connects (e.g., via a wired connection) to a respective RF frontend of the massive MIMO antenna system of the base station, to allow the testing device to test each RF frontend of the massive MIMO antenna system. In some cases (e.g., when the base station utilizes time division duplexing (TDD)), to effectively test the base station, signals communicated between an RF frontend of the testing device and an RF frontend of the base station must be phase aligned and transmitted via reciprocal uplink and downlink channels. However, many testing devices require manual configuration of the plurality of RF frontends of the testing device to ensure that the plurality of RF frontends are properly calibrated to test the RF frontends of the massive MIMO antenna system of the base station. This can be a resource intensive, time-consuming procedure that is susceptible to human error.

Some implementations described herein provide a testing device that automatically calibrates one or more RF frontends of the testing device. In some implementations, the testing device may receive, via a receiving port of an RF frontend of the testing device, a downlink pilot signal transmitted by an RF frontend of a base station. In some implementations, the testing device may determine a downlink channel associated with the downlink pilot signal and a phase associated with the downlink pilot signal. In some implementations, the testing device may transmit, via a transmitting port of the RF frontend of the testing device and based on one or more transmission settings of the testing device, an uplink pilot signal on an uplink channel that is reciprocal to the downlink channel. In some implementations, the uplink pilot signal may propagate to the receiving port of the RF frontend of the testing device (e.g., via an external circuit). In some implementations, the testing device may determine a phase associated with the uplink pilot signal and may adjust, based on the phase associated with the downlink pilot signal and the phase associated with the uplink pilot signal, the one or more transmission settings of the testing device to cause an additional uplink pilot signal to have a phase that is aligned with the phase associated with the downlink pilot signal.

In this way, the testing device automatically calibrates one or more RF frontends of the testing device so that signals transmitted by the one or more RF frontends of the testing device are phase aligned with signals transmitted by one or more RF frontends of a base station and so that the uplink and downlink channels used to communicate the signals are reciprocal. Accordingly, the testing device can reduce an amount of time to calibrate the testing device, thereby improving performance of the testing device relative to a manual calibration process. Further, the testing device can automatically calibrate the one or more RF frontends of the testing device at any time, which allows the testing device to correct for errors that result from phase drift, phase noise, and/or the like while testing the base station, which is not possible using a manual calibration process.

FIGS. 1A-1E are diagrams of one or more example implementations 100 described herein. As shown in FIGS. 1A-E, example implementation(s) 100 may include a base station, a testing device, and/or the like. The base station may include one or more RF frontends (e.g., wherein each RF frontend is respectively configured to connect to an antenna). For example, as shown in FIG. 1A, the base station may include N RF frontends (e.g., where N is greater than or equal to 1) labeled as $P_0$ through $P_{N-1}$. In some implementations, the base station may include a massive MIMO antenna system that includes the one or more RF frontends.

The testing device may include one or more RF frontends. In some implementations, the testing device may include a greater number, a lesser number, or the same number of RF frontends as the number of RF frontends included in the base station. For example, as shown in FIG. 1A, the testing device may include NRF frontends (e.g., the same number of RF frontends as the number of RF frontends included in the base station), labeled as $Q_0$ through $Q_{N-1}$. As shown in FIG. 1A, each RF frontend of the testing device may include a transmitting port (also referred to as a TX port) and/or a receiving port (also referred to as an RX port).

In some implementations, one or more RF cables may respectively connect the one or more RF frontends of the base station and the one or more RF frontends of the testing device. For example, as shown in FIG. 1A, RF frontend $P_0$ of the base station may be connected to RF frontend $Q_0$ of the testing device via an RF cable (e.g., via an external circuit connected to the RF frontend $Q_0$), RF frontend $P_1$ may be connected to RF frontend $Q_1$ (e.g., via an external circuit connected to the RF frontend Q), RF frontend $P_{N-1}$ may be connected RF frontend $Q_{N-1}$ (e.g., via an external circuit connected to the RF frontend $Q_{N-1}$), and/or the like. In this way, the testing device may be able to control communication to and from each RF frontend of the base station (e.g., via a respective RF frontend of the testing device) to allow the testing device to test the one or more RF frontends of the base station (e.g., test at least one functionality of the one or more RF frontends of the base station).

In some implementations, the testing device may include one or more external circuits that respectively connect to the one or more RF frontends of the testing device. An external circuit, such as a power splitter, an RF combiner, and/or the like, may connect a transmitting port of an RF frontend to a receiving port of the RF frontend to allow RF leakage. For example, the external circuit may be configured to allow the testing device to transmit one or more signals (e.g., via a transmitting port of an RF frontend of the testing device) to the testing device (e.g., via a receiving port of the RF frontend of the testing device). Additional details regarding functionality of the testing device and the one or more external circuits are described herein.

Figure 1B:
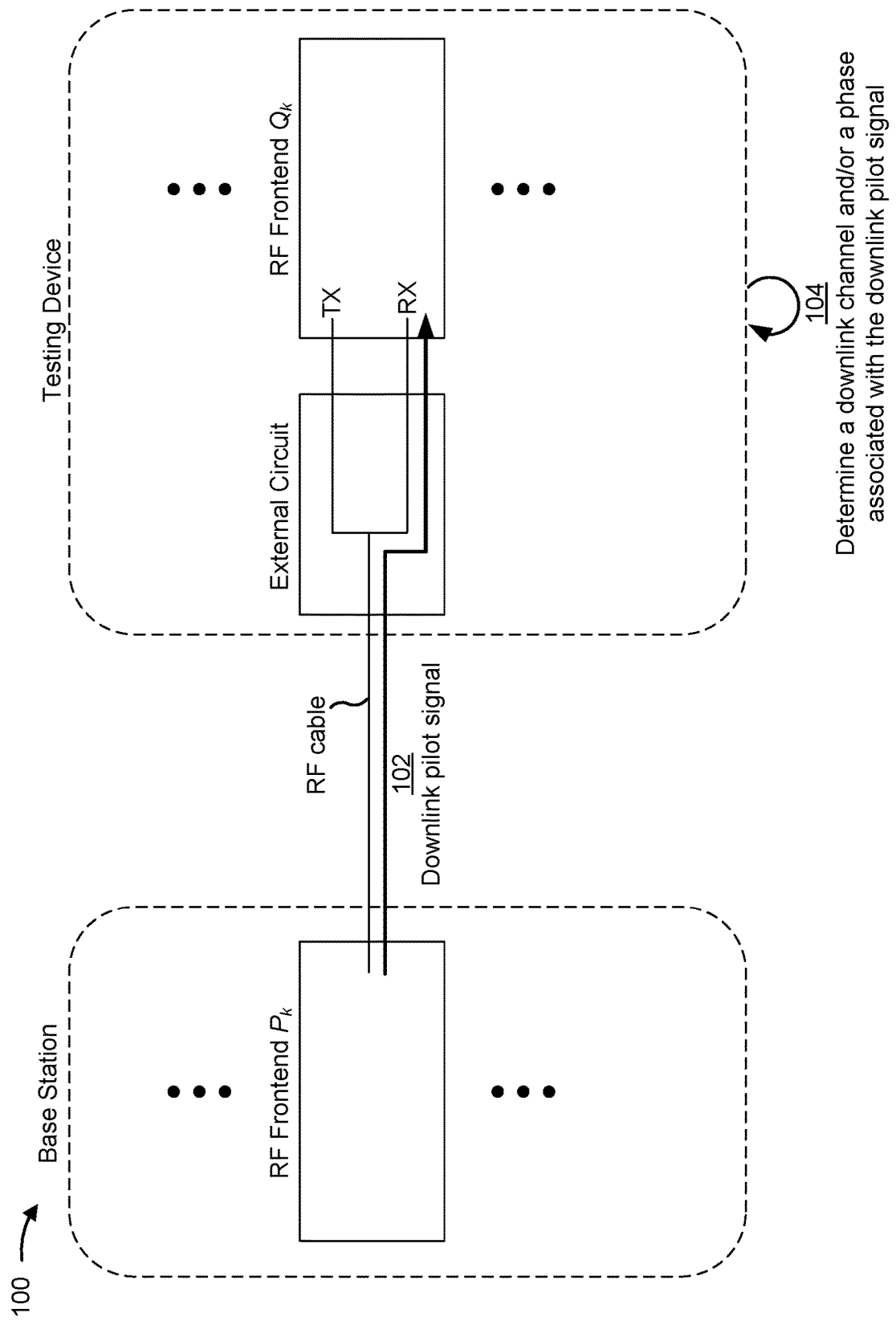

As shown in FIG. 1B and by reference number 102, the base station may generate and send a downlink pilot signal (e.g., on a downlink channel) to the testing device. For example, the base station may send the downlink pilot signal via a transmitting port (not shown) of an RF frontend $P_k$ of the base station (e.g., where k is greater than or equal to 0 and less than or equal to N−1) to a receiving port of an RF frontend $Q_k$ of the testing device. In some implementations, the downlink pilot signal may propagate from the transmitting port of the RF frontend $P_k$ to the receiving port of the RF frontend $Q_k$ via an RF cable that connects the RF frontend $P_k$ and the RF frontend $Q_k$ and/or via an external circuit connected to the RF frontend $Q_k$.

As shown by reference number 104, the testing device may process the downlink pilot signal to determine the downlink channel used to send the pilot signal from the base station to the testing device (e.g., from the transmitting port of the RF frontend $P_k$ to the receiving port of the RF frontend $Q_k$). Additionally, or alternatively, the testing device may determine a phase associated with the downlink pilot signal (e.g., measured in degrees, radians, and/or the like).

Figure 1C:
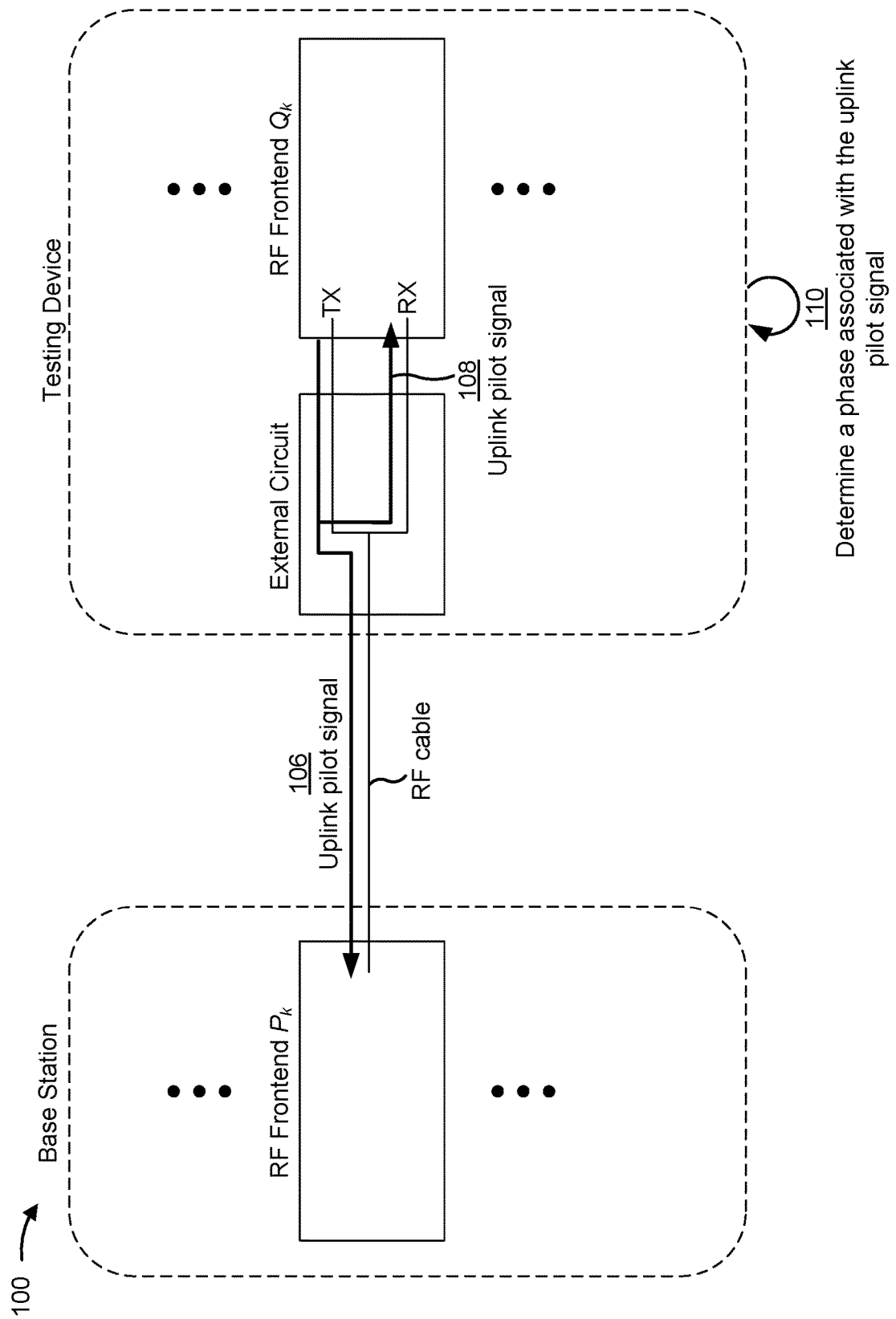

As shown in FIG. 1C and by reference number 106, the testing device may generate and transmit an uplink pilot signal (e.g., on an uplink channel) to the base station (e.g., based on one or more transmission settings). In some implementations (e.g. when the base station utilizes time division duplexing (TDD)), the uplink channel may be reciprocal to the downlink channel. For example, the testing device may cause the uplink channel to be the same as the downlink channel.

In some implementations, the testing device may process the downlink pilot signal using a phase-locked loop (PLL) to generate the uplink pilot signal, and may send the uplink pilot signal (e.g., on the uplink channel) via a transmitting port of the RF frontend $Q_k$ of the testing device to a receiving port (not shown) of the RF frontend $P_k$ of the base station. In some implementations, the one or more transmission settings control how the uplink pilot signal is generated and/or transmitted. For example, a transmission setting may control a loop filter, a voltage controlled oscillator, a phase comparator, and/or the like of the PLL, which may affect a phase associated with the uplink pilot signal. In some implementations, the uplink pilot signal may propagate from the transmitting port of the RF frontend $Q_k$ to the receiving port of the RF frontend $P_k$ via the external circuit connected to the RF frontend $Q_k$ and/or the RF cable that connects the RF frontend $Q_k$ and the RF frontend $P_k$.

As shown by reference number 108, the uplink pilot signal may propagate from the transmitting port of the RF frontend $Q_k$ to the receiving port of the RF frontend $Q_k$ via the external circuit connected to the RF frontend $Q_k$. Accordingly, the testing device may receive the uplink pilot signal via the receiving port of the RF frontend $Q_k$. As shown by reference number 110, the testing device may process the uplink pilot signal (e.g., after receiving the uplink pilot signal via the receiving port of the RF frontend $Q_k$) to determine the phase associated with the uplink pilot signal (e.g., measured in degrees, radians, and/or the like).

Figure 1D:
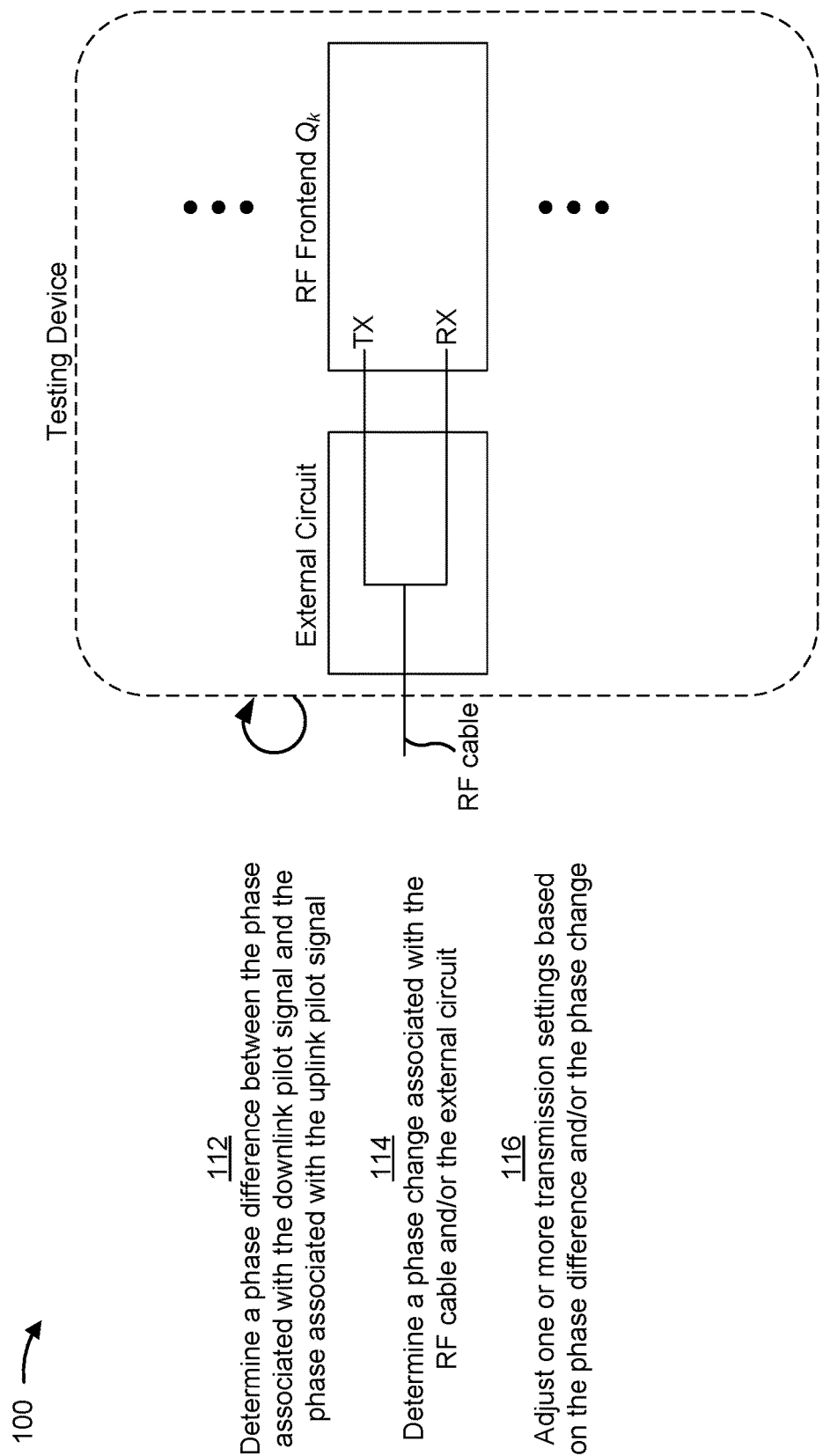

As shown in FIG. 1D and by reference number 112, the testing device may determine a phase difference (e.g., measured in degrees, radians, and/or the like) between the phase associated with the downlink pilot signal and the phase associated with the uplink pilot signal. For example, the testing device may subtract the phase associated with the downlink pilot signal from the phase associated with the uplink pilot signal to determine the phase difference between the phase associated with the downlink pilot signal and the phase associated with the uplink pilot signal.

As shown by reference number 114, the testing device may determine a phase change associated with the RF cable and/or the external circuit. For example, the testing device may generate an uplink sounding signal and may send the uplink sounding signal (e.g., on the uplink channel) via the transmitting port of the RF frontend $Q_k$ of the testing device to the receiving port of the RF frontend $P_k$ of the base station. The base station may generate, based on the uplink sounding signal, a downlink sounding signal, and may send the downlink sounding signal (e.g., on the downlink channel) via the transmitting port of the RF frontend $P_k$ of the base station to the receiving port of the RF frontend $Q_k$ of the testing device. The testing device may determine a phase of the uplink sounding signal and a phase of the downlink sounding signal, and may determine a phase difference (e.g., measured in degrees, radians, and/or the like) between the phase associated with the uplink sounding signal and the phase associated with the downlink sounding signal. Further, the testing device may determine (e.g., based on a lookup table, an algorithm, and/or the like) the phase change associated with the RF cable and/or the external circuit based on the phase difference (e.g., measured in degrees, radians, and/or the like) between the phase associated with the uplink sounding signal and the phase associated with the downlink sounding signal.

As shown by reference number 116, the testing device may adjust the one or more transmission settings (e.g., used to generate and/or transmit the uplink pilot signal) based on the phase difference between the phase associated with the downlink pilot signal and the phase associated with the uplink pilot signal and/or the phase change associated with the RF cable and/or the external circuit. For example, the testing device may determine that the phase difference between the phase associated with the downlink pilot signal and the phase associated with the uplink pilot signal satisfies (e.g., is greater than or equal to) a threshold (e.g., five degrees), which may indicate that the downlink pilot signal and the uplink pilot signal are not aligned. Accordingly, the testing device may adjust the one or more transmission settings (e.g., to change a phase of an additional uplink pilot signal). As another example, the testing device may adjust the one or more transmission settings to accommodate for the phase change associated with the RF cable and/or the external circuit.

Figure 1E:
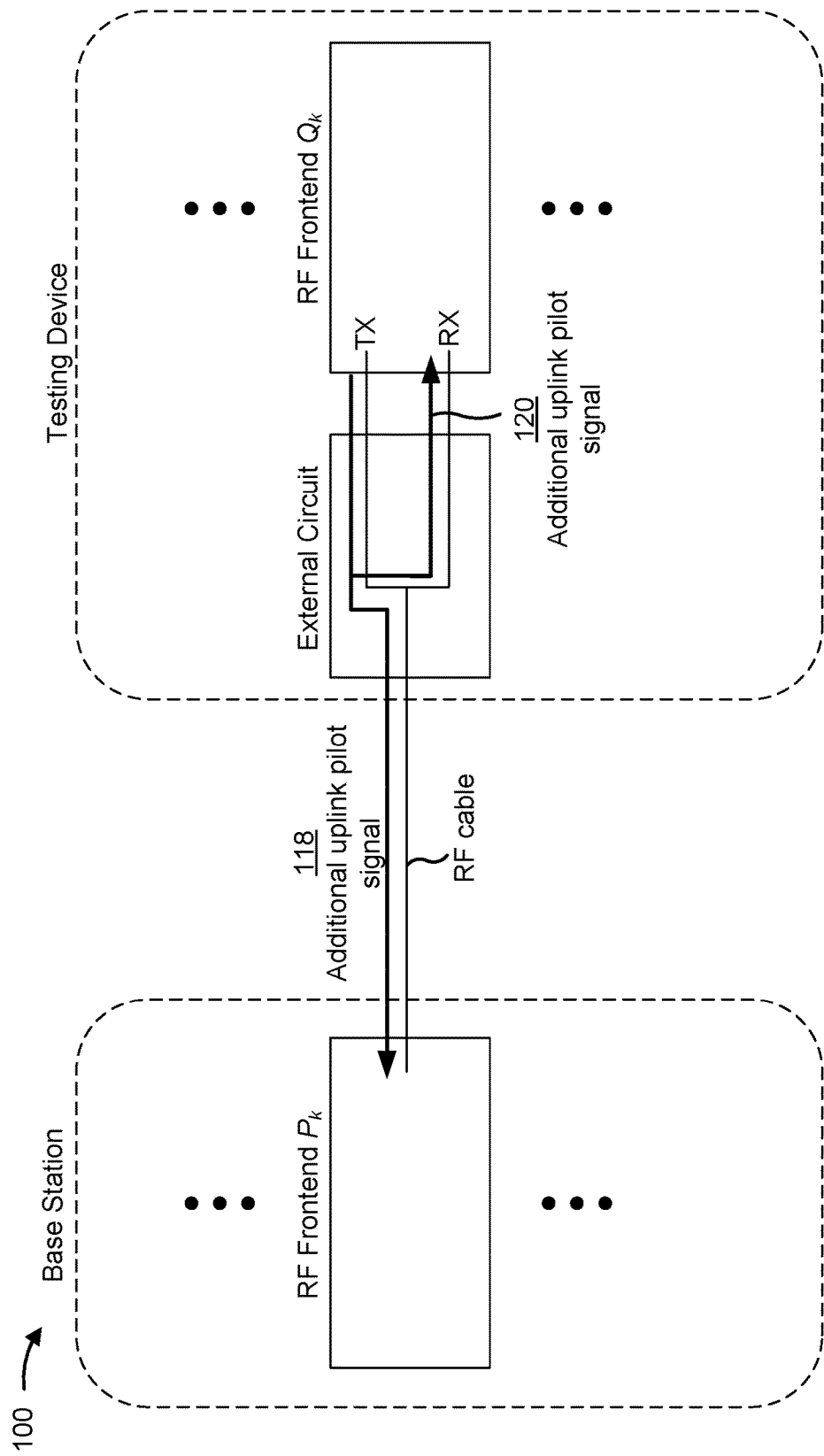

As shown in FIG. 1E and by reference number 118, the testing device may generate and transmit an additional uplink pilot signal (e.g., on the uplink channel) to the base station (e.g., based on the adjusted one or more transmission settings) in a similar manner as described herein in relation to FIG. 1C and reference number 106. For example, the testing device may use the PLL to generate the additional uplink pilot signal and may send the additional uplink pilot signal (e.g., on the uplink channel) via the transmitting port of the RF frontend $Q_k$ of the testing device to the receiving port of the RF frontend $P_k$ of the base station. In some implementations, the additional uplink pilot signal may propagate from the transmitting port of the RF frontend $Q_k$ to the receiving port of the RF frontend $P_k$ via the external circuit connected to the RF frontend $Q_k$ and/or the RF cable that connects the RF frontend $Q_k$ and the RF frontend $P_k$.

As shown by reference number 120, the additional uplink pilot signal may propagate from the transmitting port of the RF frontend $Q_k$ to the receiving port of the RF frontend $Q_k$ via the external circuit connected to the RF frontend $Q_k$. Accordingly, the testing device may receive the additional uplink pilot signal via the receiving port of the RF frontend $Q_k$.

The testing device may process the additional uplink pilot signal to determine a phase associated with the additional uplink pilot signal (e.g., in a similar manner as described herein in relation to FIG. 1C and reference number 110). Further, the testing device may determine a phase difference between the phase associated with the downlink pilot signal and the phase associated with the additional uplink pilot signal (e.g., in a similar manner as described herein in relation to FIG. 1D and reference number 112).

In some implementations, the testing device may determine that the phase of the additional uplink pilot signal is aligned with the phase associated with the downlink pilot signal (e.g., the phase difference between the phase associated with the downlink pilot signal and the phase associated with the additional uplink pilot signal does not satisfy (e.g., is less than) the threshold). Accordingly, the testing device may cease generating and sending uplink pilot signals to calibrate the RF frontend $Q_k$.

Additionally, or alternatively, the testing device may determine that the phase of the additional uplink pilot signal is not aligned with the phase associated with the downlink pilot signal (e.g., the phase difference between the phase associated with the with the downlink pilot signal and the phase associated with the additional uplink pilot signal satisfies (e.g., is greater than or equal to) the threshold). The testing device may further adjust the one or more transmission settings (e.g., adjust the one or more transmission settings again) based on the phase difference between the phase associated with the downlink pilot signal and the phase associated with the additional uplink pilot signal (e.g., in a similar manner as described herein in relation to FIG. 1D and reference number 116). The testing device may continue to generate and send additional uplink pilot signals, further adjust the one or more transmission settings, and/or the like in this way until the testing device determines that a phase of an additional uplink pilot signal is aligned with the phase associated with the downlink pilot signal.

As indicated above, FIGS. 1A-IE are provided merely as one or more examples. Other examples may differ from what is described with regard to FIGS. 1A-IE.

Figure 2:
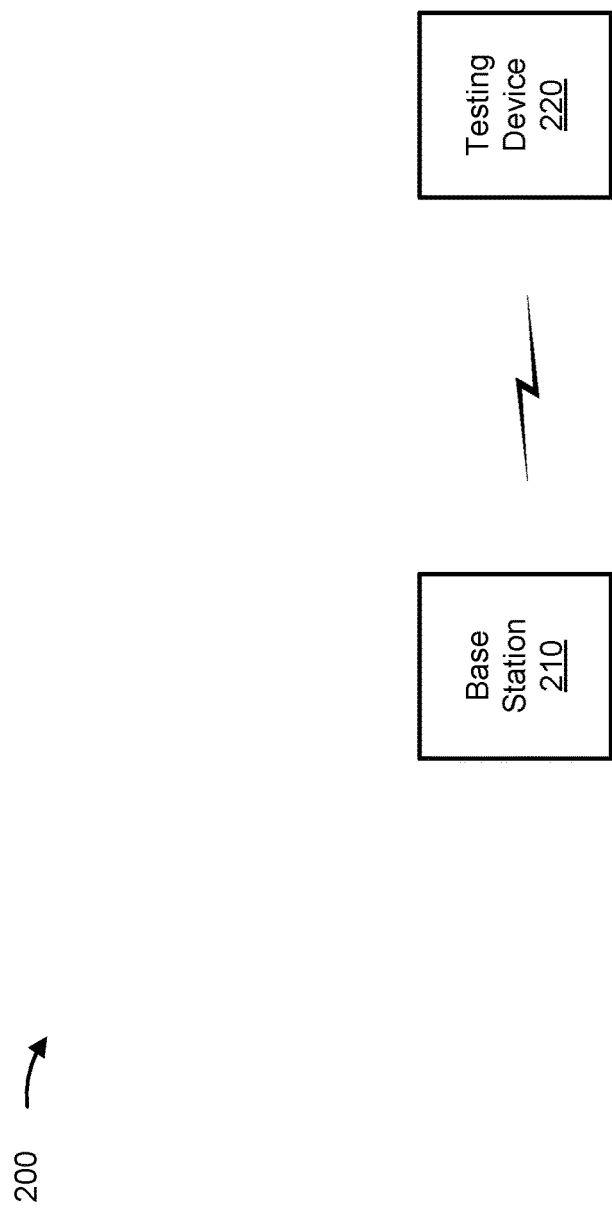
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include base station 210, testing device 220, and/or the like. Devices of environment 200 may interconnect via wired connections, wireless connections, or a combination of wired and wireless connections.

Base station 210 includes one or more devices capable of transferring traffic, such as downlink pilot signals, uplink pilot signals, and/or other traffic, destined for and/or received from testing device 220. In some implementations, base station 210 may include a next generation Node B (gNB) associated with a fifth generation (5G) network, an evolved Node B (eNB) associated with a long term evolution (LTE) network, and/or the like. Base station 210 may include one or more RF frontends. Base station 210 may include a massive multiple-input multiple-output (MIMO) antenna system (e.g., that includes the one or more RF frontends) that utilizes time division duplexing (TDD). In some implementations, base station 210 may send traffic to and/or receive traffic from testing device 220 via an air interface. Additionally, or alternatively, base station 210 may be connected to testing device 220 via one or more RF cables (e.g., an RF frontend of base station 210 (e.g., an RF frontend of the massive MIMO antenna system) is connected to an RF frontend of testing device 220) and may send traffic to and/or receive traffic from testing device 220 via the one or more RF cables.

Testing device 220 includes one or more devices capable of communicating traffic with base station 210, such as to receive downlink pilot signals from base station 210 and/or transmit uplink pilot signals to base station 210. For example, testing device 220 may include a channel analyzer, a user device (e.g., a mobile phone (e.g., a smartphone or a radiotelephone), a laptop computer, a tablet computer, a gaming device, a wearable communication device (e.g., a smart wristwatch or a pair of smart eyeglasses), an Internet of things (IoT) device, or a similar type of device), a device to simulate a plurality of user devices, or a similar type of device. Testing device 220 may include one or more RF frontends. In some implementations, testing device 220 may send traffic to and/or receive traffic from base station 210 via an air interface. Additionally, or alternatively, testing device 220 may be connected to base station 210 via one or more RF cables (e.g., an RF frontend of testing device 220 may be connected to an RF frontend of base station 210) and may send traffic to and/or receive traffic from base station 210 via the one or more RF cables.

The number and arrangement of devices and networks shown in FIG. 2 are provided as one or more examples. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
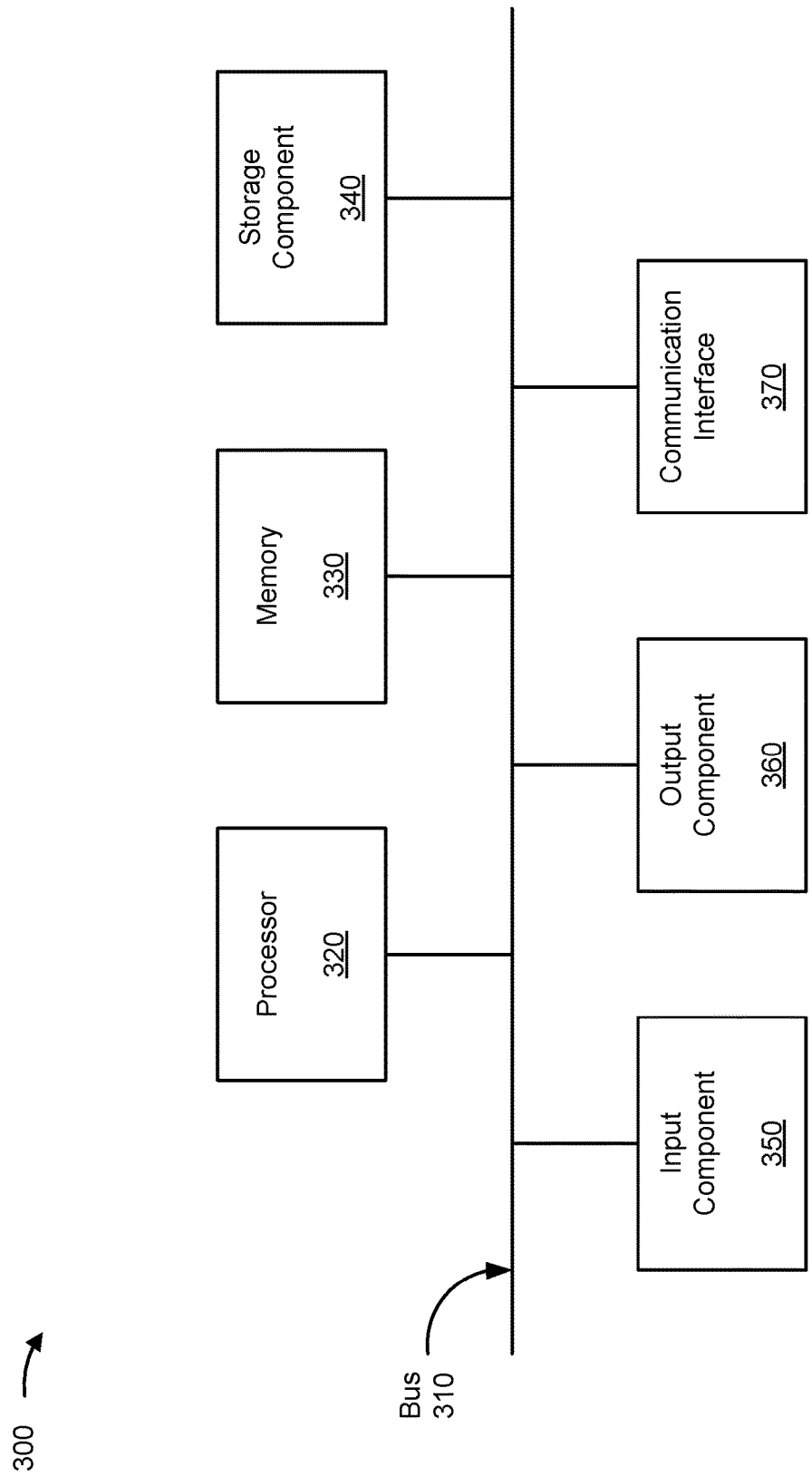
FIG. 3 is a diagram of example components of one or more devices of FIG. 2.

FIG. 3 is a diagram of example components of a device 300. Device 300 may correspond to base station 210, testing device 220, and/or the like. In some implementations, to base station 210, testing device 220, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
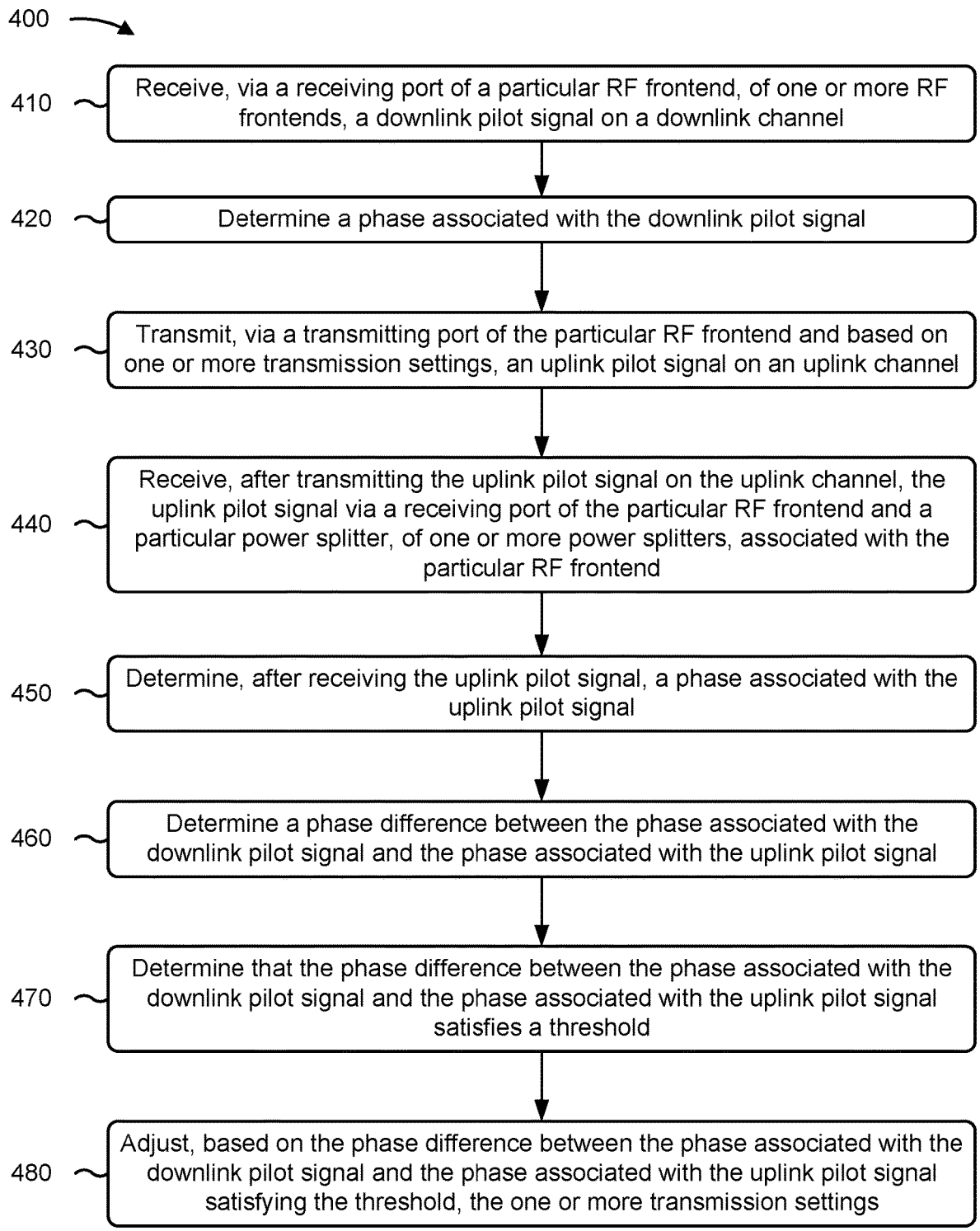

FIG. 4 is a flow chart of an example process 400 for calibrating a testing device that tests base stations with massive MIMO systems. In some implementations, one or more process blocks of FIG. 4 may be performed by a testing device (e.g., testing device 220). In some implementations, one or more process blocks of FIG. 4 may be performed by another device or a group of devices separate from or including the testing device, such as one or more additional testing devices and/or the like.

As shown in FIG. 4, process 400 may include receiving, via a receiving port of a particular RF frontend, of one or more RF frontends, a downlink pilot signal on a downlink channel (block 410). For example, the testing device (e.g., using processor 320, memory 330, storage component 340, input component 350, output component 360, communication interface 370, and/or the like) may receive, via a receiving port of a particular RF frontend, of one or more RF frontends, a downlink pilot signal on a downlink channel, as described above.

As further shown in FIG. 4, process 400 may include determining a phase associated with the downlink pilot signal (block 420). For example, the testing device (e.g., using processor 320, memory 330, storage component 340, input component 350, output component 360, communication interface 370, and/or the like) may determine a phase associated with the downlink pilot signal, as described above.

As further shown in FIG. 4, process 400 may include transmitting, via a transmitting port of the particular RF frontend and based on one or more transmission settings, an uplink pilot signal on an uplink channel (block 430). For example, the testing device (e.g., using processor 320, memory 330, storage component 340, input component 350, output component 360, communication interface 370, and/or the like) may transmit, via a transmitting port of the particular RF frontend and based on one or more transmission settings, an uplink pilot signal on an uplink channel, as described above.

As further shown in FIG. 4, process 400 may include receiving, after transmitting the uplink pilot signal on the uplink channel, the uplink pilot signal via a receiving port of the particular frontend and a particular power splitter, of one or more power splitters, associated with the particular RF frontend (block 440). For example, the testing device (e.g., using processor 320, memory 330, storage component 340, input component 350, output component 360, communication interface 370, and/or the like) may receive, after transmitting the uplink pilot signal on the uplink channel, the uplink pilot signal via a receiving port of the particular RF frontend and a particular power splitter, of one or more power splitters, associated with the particular RF frontend, as described above.

As further shown in FIG. 4, process 400 may include determining, after receiving the uplink pilot signal, a phase associated with the uplink pilot signal (block 450). For example, the testing device (e.g., using processor 320, memory 330, storage component 340, input component 350, output component 360, communication interface 370, and/or the like) may determine, after receiving the uplink pilot signal, a phase associated with the uplink pilot signal, as described above.

As further shown in FIG. 4, process 400 may include determining a phase difference between the phase associated with the downlink pilot signal and the phase associated with the uplink pilot signal (block 460). For example, the testing device (e.g., using processor 320, memory 330, storage component 340, input component 350, output component 360, communication interface 370, and/or the like) may determine a phase difference between the phase associated with the downlink pilot signal and the phase associated with the uplink pilot signal, as described above.

As further shown in FIG. 4, process 400 may include determining that the phase difference between the phase associated with the downlink pilot signal and the phase associated with the uplink pilot signal satisfies a threshold (block 470). For example, the testing device (e.g., using processor 320, memory 330, storage component 340, input component 350, output component 360, communication interface 370, and/or the like) may determine that the phase difference between the phase associated with the downlink pilot signal and the phase associated with the uplink pilot signal satisfies a threshold, as described above.

As further shown in FIG. 4, process 400 may include adjusting, based on the phase difference between the phase associated with the downlink pilot signal and the phase associated with the uplink pilot signal satisfying the threshold, the one or more transmission settings (block 480). For example, the testing device (e.g., using processor 320, memory 330, storage component 340, input component 350, output component 360, communication interface 370, and/or the like) may adjust, based on the phase difference between the phase associated with the downlink pilot signal and the phase associated with the uplink pilot signal satisfying the threshold, the one or more transmission settings, as described above.

Process 400 may include additional implementations, such as any single implementation or any combination of implementations described below and/or in connection with one or more other processes described elsewhere herein.

In a first implementation, process 400 includes transmitting, via the transmitting port of the particular RF frontend and based on the adjusted one or more transmission settings, one or more additional uplink pilot signals on the uplink channel.

In a second implementation, alone or in combination with the first implementation, process 400 includes transmitting, via the transmitting port of the particular RF frontend and based on the adjusted one or more transmission settings, an additional uplink pilot signal on the uplink channel; receiving, after transmitting the additional uplink pilot signal on the uplink channel, the additional uplink pilot signal via the receiving port of the particular RF frontend and the particular power splitter; determining, after receiving the additional uplink pilot signal, a phase associated with the additional uplink pilot signal; determining a phase difference between the phase associated with the downlink pilot signal and the phase associated with the additional uplink pilot signal; determining that the phase difference between the phase associated with the downlink pilot signal and the phase associated with the additional uplink pilot signal satisfies the threshold; and adjusting, based on the phase difference between the phase associated with the downlink pilot signal and the phase associated with the additional uplink pilot signal satisfying the threshold, the adjusted one or more transmission settings.

In a third implementation, alone or in combination with one or more of the first and second implementations, the particular RF frontend is connected to an RF frontend of a base station via the particular power splitter and an RF cable, wherein process 400, when adjusting the one or more transmission settings, includes determining a phase change associated with the particular power splitter and the RF cable, and adjusting the one or more transmission settings based on the phase difference between the phase associated with the downlink pilot signal and the phase associated with the uplink pilot signal and the phase change associated with the particular power splitter and the RF cable.

In a fourth implementation, alone or in combination with one or more of the first through third implementations, the uplink channel is reciprocal to the downlink channel.

In a fifth implementation, alone or in combination with one or more of the first through fourth implementations, the testing device receives the downlink pilot signal from a next generation Node B (gNB) associated with a fifth generation (5G) network.

In a sixth implementation, alone or in combination with one or more of the first through fifth implementations, each power splitter, of the one or more power splitters, is configured to allow radio frequency leakage between a transmitting port and a receiving port of a respectively associated RF frontend of the one or more RF frontends.

In a seventh implementation, alone or in combination with one or more of the first through sixth implementations, the one or more processors, when transmitting the uplink pilot signal on the uplink channel, are configured to cause the uplink pilot signal to propagate from the transmitting port of the particular RF frontend to the receiving port of the particular RF frontend via the particular power splitter.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
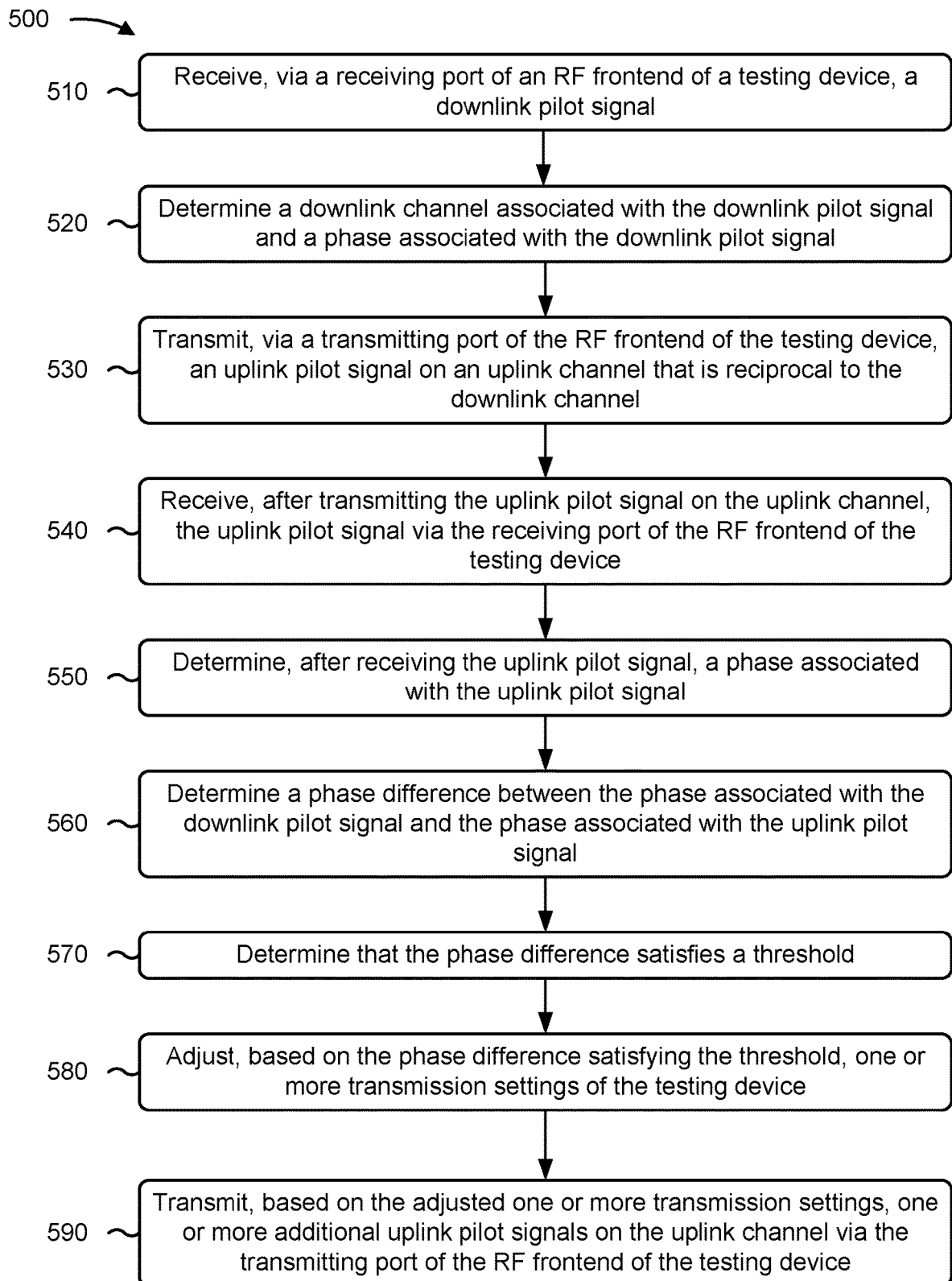

FIG. 5 is a flow chart of an example process 500 for calibrating a testing device that tests base stations with massive MIMO systems. In some implementations, one or more process blocks of FIG. 5 may be performed by a testing device (e.g., testing device 220). In some implementations, one or more process blocks of FIG. 5 may be performed by another device or a group of devices separate from or including the testing device, such as one or more additional testing devices and/or the like.

As shown in FIG. 5, process 500 may include receiving, via a receiving port of an RF frontend of the testing device, a downlink pilot signal (block 510). For example, the testing device (e.g., using processor 320, memory 330, storage component 340, input component 350, output component 360, communication interface 370, and/or the like) may receive, via a receiving port of an RF frontend of the testing device, a downlink pilot signal, as described above.

As further shown in FIG. 5, process 500 may include determining a downlink channel associated with the downlink pilot signal and a phase associated with the downlink pilot signal (block 520). For example, the testing device (e.g., using processor 320, memory 330, storage component 340, input component 350, output component 360, communication interface 370, and/or the like) may determine a downlink channel associated with the downlink pilot signal and a phase associated with the downlink pilot signal, as described above.

As further shown in FIG. 5, process 500 may include transmitting, via a transmitting port of the RF frontend of the testing device, an uplink pilot signal on an uplink channel that is reciprocal to the downlink channel (block 530). For example, the testing device (e.g., using processor 320, memory 330, storage component 340, input component 350, output component 360, communication interface 370, and/or the like) may transmit, via a transmitting port of the RF frontend of the testing device, an uplink pilot signal on an uplink channel that is reciprocal to the downlink channel, as described above.

As further shown in FIG. 5, process 500 may include receiving, after transmitting the uplink pilot signal on the uplink channel, the uplink pilot signal via the receiving port of the RF frontend of the testing device (block 540). For example, the testing device (e.g., using processor 320, memory 330, storage component 340, input component 350, output component 360, communication interface 370, and/or the like) may receive, after transmitting the uplink pilot signal on the uplink channel, the uplink pilot signal via the receiving port of the RF frontend of the testing device, as described above.

As further shown in FIG. 5, process 500 may include determining, after receiving the uplink pilot signal, a phase associated with the uplink pilot signal (block 550). For example, the testing device (e.g., using processor 320, memory 330, storage component 340, input component 350, output component 360, communication interface 370, and/or the like) may determine, after receiving the uplink pilot signal, a phase associated with the uplink pilot signal, as described above.

As further shown in FIG. 5, process 500 may include determining a phase difference between the phase associated with the downlink pilot signal and the phase associated with the uplink pilot signal (block 560). For example, the testing device (e.g., using processor 320, memory 330, storage component 340, input component 350, output component 360, communication interface 370, and/or the like) may determine a phase difference between the phase associated with the downlink pilot signal and the phase associated with the uplink pilot signal, as described above.

As further shown in FIG. 5, process 500 may include determining that the phase difference satisfies a threshold (block 570). For example, the testing device (e.g., using processor 320, memory 330, storage component 340, input component 350, output component 360, communication interface 370, and/or the like) may determine that the phase difference satisfies a threshold, as described above.

As further shown in FIG. 5, process 500 may include adjusting, based on the phase difference satisfying the threshold, one or more transmission settings of the testing device (block 580). For example, the testing device (e.g., using processor 320, memory 330, storage component 340, input component 350, output component 360, communication interface 370, and/or the like) may adjust, based on the phase difference satisfying the threshold, one or more transmission settings of the testing device, as described above.

As further shown in FIG. 5, process 500 may include transmitting, based on the adjusted one or more transmission settings, one or more additional uplink pilot signals on the uplink channel via the transmitting port of the RF frontend of the testing device (block 590). For example, the testing device (e.g., using processor 320, memory 330, storage component 340, input component 350, output component 360, communication interface 370, and/or the like) may transmit, based on the adjusted one or more transmission settings, one or more additional uplink pilot signals on the uplink channel via the transmitting port of the RF frontend of the testing device, as described above.

Process 500 may include additional implementations, such as any single implementation or any combination of implementations described below and/or in connection with one or more other processes described elsewhere herein.

In a first implementation, the testing device receives the downlink pilot signal from a base station.

In a second implementation, alone or in combination with the first implementation, the RF frontend of the testing device is connected to an RF frontend of a base station via a radio frequency (RF) cable.

In a third implementation, alone or in combination with one or more of the first and second implementations, the threshold is five degrees, and determining that the phase difference satisfies the threshold comprises determining that the phase difference is greater than or equal to the threshold.

In a fourth implementation, alone or in combination with one or more of the first through third implementations, the transmitting port of the RF frontend of the testing device and the receiving port of the RF frontend of the testing device are connected via an external circuit, and transmitting the uplink pilot signal via the transmitting port of the RF frontend of the testing device causes the uplink pilot signal to propagate to the receiving port of the RF frontend of the testing device via the external circuit.

In a fifth implementation, alone or in combination with one or more of the first through fourth implementations, the external circuit is an RF power splitter.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for calibrating a testing device that tests base stations with massive MIMO systems. In some implementations, one or more process blocks of FIG. 6 may be performed by a testing device (e.g., testing device 220). In some implementations, one or more process blocks of FIG. 6 may be performed by another device or a group of devices separate from or including the testing device, such as one or more additional testing devices and/or the like.

As shown in FIG. 6, process 600 may include receiving, via a receiving port of an RF frontend of a testing device, a downlink pilot signal transmitted by an RF frontend of a base station (block 610). For example, the testing device (e.g., using processor 320, memory 330, storage component 340, input component 350, output component 360, communication interface 370, and/or the like) may receive, via a receiving port of an RF frontend of the testing device, a downlink pilot signal transmitted by an RF frontend of a base station, as described above.

As further shown in FIG. 6, process 600 may include determining a phase associated with the downlink pilot signal (block 620). For example, the testing device (e.g., using processor 320, memory 330, storage component 340, input component 350, output component 360, communication interface 370, and/or the like) may determine a phase associated with the downlink pilot signal, as described above.

As further shown in FIG. 6, process 600 may include transmitting, via a transmitting port of the RF frontend of the testing device and based on one or more transmission settings of the testing device, an uplink pilot signal to the base station (block 630). For example, the testing device (e.g., using processor 320, memory 330, storage component 340, input component 350, output component 360, communication interface 370, and/or the like) may transmit, via a transmitting port of the RF frontend of the testing device and based on one or more transmission settings of the testing device, an uplink pilot signal to the base station, as described above.

As further shown in FIG. 6, process 600 may include receiving, after transmitting the uplink pilot signal, the uplink pilot signal via the receiving port of the RF frontend of the testing device (block 640). For example, the testing device (e.g., using processor 320, memory 330, storage component 340, input component 350, output component 360, communication interface 370, and/or the like) may receive, after transmitting the uplink pilot signal, the uplink pilot signal via the receiving port of the RF frontend of the testing device, as described above.

As further shown in FIG. 6, process 600 may include determining, after receiving the uplink pilot signal, a phase associated with the uplink pilot signal (block 650). For example, the testing device (e.g., using processor 320, memory 330, storage component 340, input component 350, output component 360, communication interface 370, and/or the like) may determine, after receiving the uplink pilot signal, a phase associated with the uplink pilot signal, as described above.

Process 600 may include additional implementations, such as any single implementation or any combination of implementations described below and/or in connection with one or more other processes described elsewhere herein.

In a first implementation, when selectively adjusting the one or more transmission settings of the testing device, process 600 includes determining a phase difference between the phase associated with the downlink pilot signal and the phase associated with the uplink pilot signal and selectively adjusting, based on the phase difference, the one or more transmission settings of the testing device.

In a second implementation, alone or in combination with the first implementation, the base station includes a massive multiple-input multiple-output (MIMO) antenna system that utilizes time division duplexing (TDD), and the RF frontend of the testing device is connected to an RF frontend of the massive MIMO antenna system of the base station via an RF cable and an external circuit.

In a third implementation, alone or in combination with one or more of the first and second implementations, the RF frontend of the testing device is connected to a RF frontend of the base station via an RF cable and an external circuit and selectively adjusting the one or more transmission settings of the testing device includes determining a phase change associated with the external circuit and the RF cable; determining a phase difference between the phase associated with the downlink pilot signal and the phase associated with the uplink pilot signal, and selectively adjusting, based on the phase change and the phase difference, the one or more transmission settings of the testing device.

In a fourth implementation, alone or in combination with one or more of the first through third implementations, the transmitting port of the RF frontend of the testing device and the receiving port of the RF frontend of the testing device are connected via an RF power splitter, and transmitting the uplink pilot signal via the transmitting port of the RF frontend of the testing device is to cause the uplink pilot signal to propagate to the receiving port of the RF frontend of the testing device via the RF power splitter.

In a fifth implementation, alone or in combination with one or more of the first through fourth implementations, selectively adjusting the one or more transmission settings of the testing device includes adjusting the one or more transmission settings of the testing device, and process 600 further includes transmitting, based on the adjusted one or more transmission settings, one or more additional uplink pilot signals via the transmitting port of the RF frontend of the testing device, wherein the one or more additional uplink pilot signals are associated with respective phases that are aligned with the phase associated with the downlink pilot signal.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A testing device, comprising:
   one or more radio frequency (RF) frontends, wherein each RF frontend, of the one or more RF frontends, includes a respective transmitting port and a respective receiving port;
   one or more power splitters, wherein each power splitter, of the one or more power splitters, is connected to a respective RF frontend of the one or more RF frontends; and
   one or more processors configured to:
   receive, via a receiving port of a particular RF frontend, of the one or more RF frontends, a downlink pilot signal on a downlink channel;
   determine a phase associated with the downlink pilot signal;
   transmit, via a transmitting port of the particular RF frontend and based on one or more transmission settings, an uplink pilot signal on an uplink channel;
   receive, after transmitting the uplink pilot signal on the uplink channel, the uplink pilot signal via the receiving port of the particular RF frontend and a particular power splitter, of the one or more power splitters, associated with the particular RF frontend;
   determine, after receiving the uplink pilot signal, a phase associated with the uplink pilot signal;
   determine a phase difference between the phase associated with the downlink pilot signal and the phase associated with the uplink pilot signal;
   determine that the phase difference between the phase associated with the downlink pilot signal and the phase associated with the uplink pilot signal satisfies a threshold; and
   adjust, based on the phase difference between the phase associated with the downlink pilot signal and the phase associated with the uplink pilot signal satisfying the threshold, the one or more transmission settings.

2. The testing device of claim 1, wherein the one or more processors are further configured to:
   transmit, via the transmitting port of the particular RF frontend and based on the adjusted one or more transmission settings, one or more additional uplink pilot signals on the uplink channel.

3. The testing device of claim 1, wherein the one or more processors are further configured to:
   transmit, via the transmitting port of the particular RF frontend and based on the adjusted one or more transmission settings, an additional uplink pilot signal on the uplink channel;
   receive, after transmitting the additional uplink pilot signal on the uplink channel, the additional uplink pilot signal via the receiving port of the particular RF frontend and the particular power splitter;

determine, after receiving the additional uplink pilot signal, a phase associated with the additional uplink pilot signal;

determine a phase difference between the phase associated with the downlink pilot signal and the phase associated with the additional uplink pilot signal;

determine that the phase difference between the phase associated with the downlink pilot signal and the phase associated with the additional uplink pilot signal satisfies the threshold; and adjust, based on the phase difference between the phase associated with the downlink pilot signal and the phase associated with the additional uplink pilot signal satisfying the threshold, the adjusted one or more transmission settings.

4. The testing device of claim 1, wherein the particular RF frontend is connected to an RF frontend of a base station via the particular power splitter and an RF cable, wherein the one or more processors, when adjusting the one or more transmission settings, are configured to:
determine a phase change associated with the particular power splitter and the RF cable; and
adjust the one or more transmission settings based on the phase difference between the phase associated with the downlink pilot signal and the phase associated with the uplink pilot signal and the phase change associated with the particular power splitter and the RF cable.

5. The testing device of claim 1, wherein the uplink channel is reciprocal to the downlink channel.

6. The testing device of claim 1, wherein the testing device receives the downlink pilot signal from a next generation Node B (gNB) associated with a fifth generation (5G) network.

7. The testing device of claim 1, wherein each power splitter, of the one or more power splitters, is configured to allow radio frequency leakage between a transmitting port and a receiving port of a respectively associated RF frontend of the one or more RF frontends.

8. The testing device of claim 1, wherein the one or more processors, when transmitting the uplink pilot signal on the uplink channel, are configured to cause the uplink pilot signal to propagate from the transmitting port of the particular RF frontend to the receiving port of the particular RF frontend via the particular power splitter.

9. A method, comprising:
receiving, by a testing device and via a receiving port of a radio frequency (RF) frontend of the testing device, a downlink pilot signal;
determining, by the testing device, a downlink channel associated with the downlink pilot signal and a phase associated with the downlink pilot signal;
transmitting, by the testing device and via a transmitting port of the RF frontend of the testing device, an uplink pilot signal on an uplink channel that is reciprocal to the downlink channel;
receiving, by the testing device and after transmitting the uplink pilot signal on the uplink channel, the uplink pilot signal via the receiving port of the RF frontend of the testing device;
determining, by the testing device and after receiving the uplink pilot signal, a phase associated with the uplink pilot signal;

determining, by the testing device, a phase difference between the phase associated with the downlink pilot signal and the phase associated with the uplink pilot signal;
determining, by the testing device, that the phase difference satisfies a threshold;
adjusting, by the testing device and based on the phase difference satisfying the threshold, one or more transmission settings of the testing device; and
transmitting, by the testing device and based on the adjusted one or more transmission settings, one or more additional uplink pilot signals on the uplink channel via the transmitting port of the RF frontend of the testing device.

10. The method of claim 9, wherein the testing device receives the downlink pilot signal from a base station.

11. The method of claim 9, wherein the RF frontend of the testing device is connected to an RF frontend of a base station via an RF cable.

12. The method of claim 9, wherein the threshold is five degrees,
wherein determining that the phase difference satisfies the threshold comprises determining that the phase difference is greater than or equal to the threshold.

13. The method of claim 9, wherein the transmitting port of the RF frontend of the testing device and the receiving port of the RF frontend of the testing device are connected via an external circuit,
wherein transmitting the uplink pilot signal via the transmitting port of the RF frontend of the testing device causes the uplink pilot signal to propagate to the receiving port of the RF frontend of the testing device via the external circuit.

14. The method of claim 13, wherein the external circuit is an RF power splitter.

15. A non-transitory computer-readable medium storing instructions, the instructions comprising:
one or more instructions that, when executed by one or more processors of a testing device, cause the one or more processors to:
receive, via a receiving port of a radio frequency (RF) frontend of the testing device, a downlink pilot signal transmitted by an RF frontend of a base station;
determine a phase associated with the downlink pilot signal;
transmit, via a transmitting port of the RF frontend of the testing device and based on one or more transmission settings of the testing device, an uplink pilot signal to the base station;
receive, after transmitting the uplink pilot signal, the uplink pilot signal via the receiving port of the RF frontend of the testing device;
determine, by the testing device and after receiving the uplink pilot signal, a phase associated with the uplink pilot signal; and
selectively adjust, based on the phase associated with the downlink pilot signal and the phase associated with the uplink pilot signal, the one or more transmission settings of the testing device.

16. The non-transitory computer-readable medium of claim 15, wherein the one or more instructions, that cause the one or more processors to selectively adjust the one or more transmission settings of the testing device, cause the one or more processors to:

determine a phase difference between the phase associated with the downlink pilot signal and the phase associated with the uplink pilot signal; and selectively adjust, based on the phase difference, the one or more transmission settings of the testing device.

17. The non-transitory computer-readable medium of claim 15, wherein the base station includes a massive multiple-input multiple-output (MIMO) antenna system that utilizes time division duplexing (TDD), wherein the RF frontend of the testing device is connected to an RF frontend of the massive MIMO antenna system of the base station via an RF cable and an external circuit.

18. The non-transitory computer-readable medium of claim 15, wherein the RF frontend of the testing device is connected to an RF frontend of the base station via an RF cable and an external circuit, wherein the one or more instructions, that cause the one or more processors to selectively adjust the one or more transmission settings of the testing device, cause the one or more processors to:

determine a phase change associated with the external circuit and the RF cable;

determine a phase difference between the phase associated with the downlink pilot signal and the phase associated with the uplink pilot signal; and selectively adjust, based on the phase change and the phase difference, the one or more transmission settings of the testing device.

19. The non-transitory computer-readable medium of claim 15, wherein the transmitting port of the RF frontend of the testing device and the receiving port of the RF frontend of the testing device are connected via an RF power splitter, wherein transmitting the uplink pilot signal via the transmitting port of the RF frontend of the testing device is to cause the uplink pilot signal to propagate to the receiving port of the RF frontend of the testing device via the RF power splitter.

20. The non-transitory computer-readable medium of claim 15, wherein the one or more instructions, that cause the one or more processors to selectively adjust the one or more transmission settings of the testing device, cause the one or more processors to:

adjust the one or more transmission settings of the testing device, wherein the one or more instructions, when executed by the one or more processors, further cause the one or more processors to:

transmit, based on the adjusted one or more transmission settings, one or more additional uplink pilot signals via the transmitting port of the RF frontend of the testing device, wherein the one or more additional uplink pilot signals are associated with respective phases that are aligned with the phase associated with the downlink pilot signal.

* * * * *